(No Model.)

F. SCHELP, Jr.
TWO WHEELED VEHICLE.

No. 304,567. Patented Sept. 2, 1884.

Attest:
Charles Pickles
C. E. Hunt

Inventor:
Fred Schelp Jr.
by A. D. Moody
atty

UNITED STATES PATENT OFFICE.

FRED. SCHELP, JR., OF BALLWIN, MISSOURI.

TWO-WHEELED VEHICLE.

SPECIFICATION forming part of Letters Patent No. 304,567, dated September 2, 1884.

Application filed February 23, 1884. (No model.)

*To all whom it may concern:*

Be it known that I, FRED. SCHELP, Jr., of Ballwin, St. Louis county, Missouri, have made a new and useful Improvement in Two-Wheel Vehicles, of which the following is a full, clear, and exact description, reference being had to the annexed drawings, making part of this specification, in which—

Figure 1:
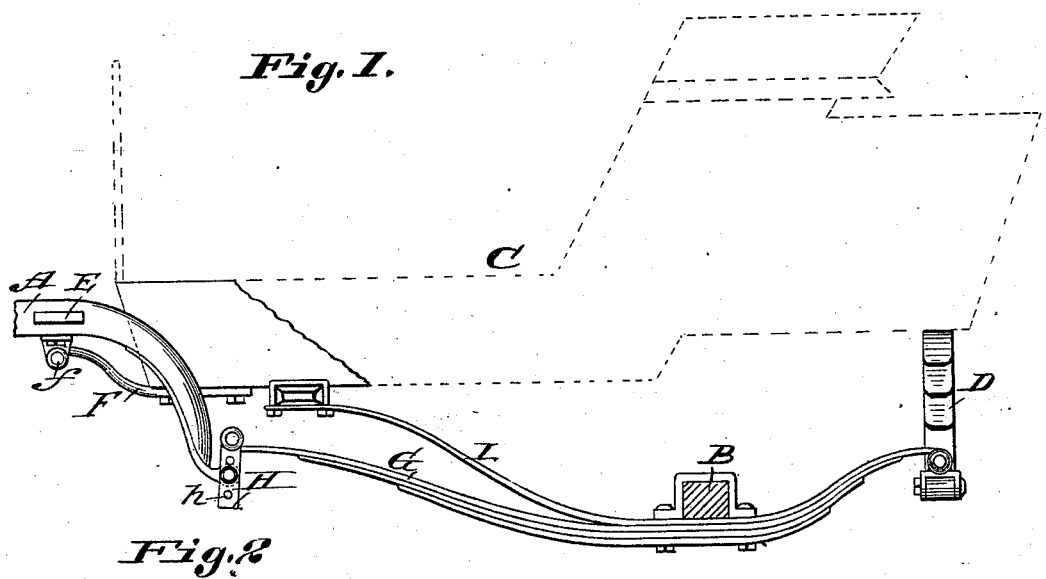
Figure 2:
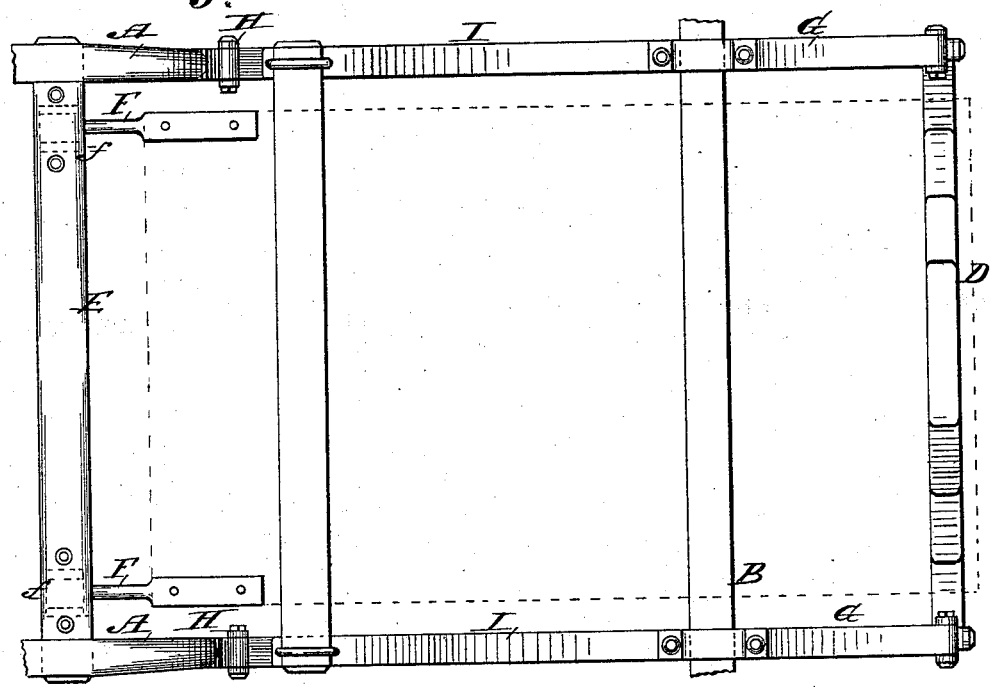

Figure 1 is a side elevation of the improvement, and Fig. 2 a plan.

The same letters of reference denote the same parts.

This invention is an improvement in that class of devices which are employed to prevent the motion of the shafts from being communicated to the vehicle-body.

A A represent the shafts of the vehicle; B, the axle, and C the body. The body at its rear end is upheld by a suitable support—such as the spring D—and at its forward end is jointed to the shafts or to the cross-bar E of the shafts. By means of this connection the draft of the shafts is applied to the vehicle, and by reason of the connection being a jointed one a bearing is provided upon which the shafts can turn vertically, and not shake the body. The attachment in question is attained practically by means of the irons F F, which extend from the body forward, and are jointed to the cross-bar E at $f\,f$. The shafts extend rearwardly past the joints $f\,f$, and at their rear ends are jointed to the springs G G. These springs in turn are attached to the axle B, and by extending them rearwardly past the axle they provide a convenient support for the spring D. The shafts and springs G G are connected by means of the shackles H H. The shackles have a series, $h$, of holes, to enable the point of connection of the shafts to be higher or lower, as desired. The connection of the shafts with the springs G G is not for draft, but to hold the rear ends of the shafts in place vertically; and without a connection substantially such as the shackles H H the device would be practically inoperative, as the shafts and springs could not move upon each other in their vibration.

An additional feature of the construction is the springs I I, which extend from the axle to the body, substantially as shown, and assist in upholding the body and in limiting the vibration of the shafts.

It will be observed that the rear end of the shafts can rise and fall in rear of the point where the body is jointed to the shafts. The vibration of the shafts is thus largely prevented from being communicated either to the vehicle-body or to the vehicle-axle.

A pole can be used in place of shafts in vehicles having the present improvement.

I claim—

1. A two-wheeled vehicle whose shafts A A are attached thereto by a jointed connection, the ends of the pole or shafts extending in rear of the connection, but not as far back as the vehicle-axle, and being attached by means of the shackles H H to springs which lead to the axle, as described.

2. The combination, as described, of the pole or shafts A A, the axle B, the body C, the irons F F, the shackles H H, and the springs G G, said springs G G leading from the shafts to the axle.

3. The combination, as described, of the pole or shafts A A, the axle B, the body C, the spring D, the irons F F, the springs G G and I I, and the shackles H H.

4. A two-wheeled vehicle whose body is elastically supported, and whose pole or shafts are jointed to the vehicle, enabling the pole or shafts to turn vertically upon their joints, and their rear ends, which are shackled to springs, which lead from the pole or shafts to the axle to vibrate between the axle and the points at which they are jointed to the vehicle.

FRED. SCHELP, JR.

Witnesses:
F. SCHELP, Sr.,
GEO. H. SCHELP.